United States Patent
Crovetto

(10) Patent No.: US 7,311,877 B2
(45) Date of Patent: Dec. 25, 2007

(54) INHIBITION OF CORROSION IN FLUID SYSTEMS

(75) Inventor: Rosa Crovetto, Wayne, PA (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 10/631,562

(22) Filed: Jul. 31, 2003

(65) Prior Publication Data

US 2005/0025661 A1   Feb. 3, 2005

(51) Int. Cl.
*C23F 11/10* (2006.01)

(52) U.S. Cl. .......................... 422/11; 422/14; 252/388

(58) Field of Classification Search ................ 422/11, 422/14
See application file for complete search history.

(56) References Cited

U.S. PATENT DOCUMENTS

| | | | |
|---|---|---|---|
| 3,977,994 A | | 8/1976 | Geiser |
| 4,231,842 A | * | 11/1980 | Ojala ......................... 162/47 |
| 4,305,853 A | | 12/1981 | Kronstein et al. |
| 4,599,185 A | * | 7/1986 | Towers et al. ............... 252/68 |
| 4,722,805 A | | 2/1988 | Martin |
| 4,915,934 A | | 4/1990 | Tomlinson |
| 4,970,026 A | | 11/1990 | Mullins et al. |
| 5,082,592 A | | 1/1992 | McDonald |
| 5,120,357 A | | 6/1992 | Eichberg et al. |
| 5,368,774 A | * | 11/1994 | Borgard et al. ............. 252/391 |
| 5,368,775 A | | 11/1994 | Rossi et al. |
| 5,616,278 A | * | 4/1997 | Carey et al. ................ 252/180 |
| 6,204,225 B1 | | 3/2001 | Lightcap, Jr. |

FOREIGN PATENT DOCUMENTS

| | | | |
|---|---|---|---|
| EP | 0 108 536 | | 5/1984 |
| EP | 0522161 | | 1/1993 |
| FR | 2422731 | | 11/1979 |
| JP | 6424897 A | * | 1/1989 |
| NL | 9400379 | | 3/1994 |

OTHER PUBLICATIONS

Okun, N.M. et al. Abstract of "Use of phosphatides in inhibiting additives for DVS cooling fluids," Energomashinostroenie (1978), (1), 25-6.*

Pujar et al, "A novel corrosion inhibitor for aluminum alloys using the beef lipids" Journal of Materials Science Letters 19, 2000, 1797-1799.

International Search Report: PCT/US 2004/019794.

* cited by examiner

*Primary Examiner*—E. Leigh McKane
(74) *Attorney, Agent, or Firm*—Duane Morris LLP

(57) ABSTRACT

The present invention provides an effective method of inhibiting corrosion on metallic surfaces in contact with a fluid contained in an industrial system, which includes adding to such fluid an effective corrosion controlling amount of a phosphoglyceride compound, optionally with emulsified soybean oil.

9 Claims, No Drawings

INHIBITION OF CORROSION IN FLUID SYSTEMS

FIELD OF THE INVENTION

The present invention relates generally to the protection of metallic surfaces from corrosion in both the vapor and liquid phases of aqueous and non-aqueous fluid systems. More specifically, the present invention relates to corrosion inhibiting compositions and methods of using the same.

BACKGROUND OF THE INVENTION

Corrosion of metallic components in plants may cause system failures and sometimes plant shutdowns. In addition, corrosion products accumulated on the metal surface will decrease the rate of heat transfer between the metal surface and the water or other fluid media, and therefore corrosion will reduce the efficiency of the system operation. Therefore, corrosion can increase maintenance and production costs.

The most common way to combat corrosion is to add corrosion inhibiting additives to the fluid of such systems. However, currently available corrosion inhibiting additives are either non-biodegradable, toxic, or both, which limits the applicability of such additives.

The most common anti-corrosion additives used in connection with boiler condensate systems are neutralizing amines and filming amines. While amines and combinations of amines generally provide effective protection against the corrosion of steel and other ferrous-containing metals, the use of amines in anti-corrosion additives presents several problems.

First, amines often undergo thermal decomposition at high temperatures and form ammonia, which can be very corrosive to copper and copper alloys, especially in the presence of oxygen. Thus, amine-containing corrosion inhibitors are often unsatisfactory for use in systems containing copper or copper alloy metallurgies.

Further, in a number of applications including food processing, beverage production, co-generation plants, and pharmaceutical manufacturing, the use of amines is limited due to governmental regulations or concerns for taste and odor problems. Consequently, in many of these applications, no anti-corrosion treatment program is used at all. Therefore, these systems are susceptible to high corrosion rates, significant maintenance costs and high equipment failure rates.

U.S. Pat. No. 5,368,775 discusses methods of controlling acid induced corrosion. In one method, a thin film is used as a barrier between the metal surface to be protected and the acidic solution. Long chain amines such as octadecyl amine or azoles are used to form the thin film. The second method requires the addition of neutralizing amines to neutralize the acid and raise the aqueous pH. The best amines for this method are described as having a high basicity and a low molecular weight. Cyclohexylamine, dimethylamine, trimethylamine, morpholine, and methoxypropylamine were cited as examples of neutralizing amines.

U.S. Pat. No. 4,915,934 discloses a foamable biocide composition comprising an alcoholic chlorohexidine solution, quick breaking foaming agent, an aerosol propellant, and corrosion inhibitor to counter the corrosive nature of the alcoholic chlorohexidine solution. The quick breaking foaming agent contains, as one of its ingredients, a surface active agent, preferably an ethoxylated sorbitan ester. The surface active agent acts as an emulsifier. Examples of the preferred emulsifier given include ethoxylated sorbitan stearate, palmitate, and oleate; nonyl phenol ethoxylates; and, fatty alcohol ethoxylates.

U.S. Pat. No. 3,977,994 discloses a rust inhibiting composition. The composition is a mixture of an organic acid, an N-alkyl or cycloalkyl substituted ethanolamine, and water. In some cases, the composition may also contain at least one emulsifying agent to permit the emulsion of the organic acid and the ethanolamine. Examples of the emulsifying agent include sorbitan derivatives.

U.S. Pat. No. 4,970,026 teaches a corrosion inhibitor for ferrous and non-ferrous aqueous systems. The composition comprises a component selected from a naphthenic oil based sodium salt of a triethanolamine alkylsulfamido, carboxylic acid; a paraffinic oil based sodium salt of a triethanolamine alkylsulfamido carboxylic acid; a sodium salt of an alkylsulfamido carboxylic acid; and a mixture consisting of two choices as well as a surfactant selected from a long chain fatty acid derivative of sarcosine and a condensation product of ethylene oxide and a fatty acid.

The inhibiting effects are attributed to the component or mixture of components, not to the addition of the surfactant. In fact, the patent states that the surfactants were tested separately for their effectiveness as corrosion inhibitors. The surfactants were found to be ineffective as corrosion inhibitors.

U.S. Pat. No. 5,082,592 discloses a method for inhibiting corrosion for ferrous metals in aqueous solution comprising a nonionic surfactant and an anionic oxygen containing group such as alkali metal salts of borate, molybdate, and nitrate/nitrite. The preferred nonionic surfactant is phenol/polyethylene oxide.

It is postulated in the specification that the nonionic surfactant increases the corrosion inhibition properties of the anions. The inhibition properties of the anions result from their adsorption at the interface of the metal surface and the solution. It is believed that the co-absorption of the nonionic surfactant serves to maximize the surface concentration of the anions by shielding the anions' hydrostatic repulsive forces.

EPO Patent Application, No. 0 108 536 B1 discloses a method for protecting metal surfaces from corrosion. The method uses a composition of a corrosion inhibitor with a thickening agent. The corrosion inhibitor may include carboxylic acid esters of sorbitan. In combination with a thickening agent, the corrosion inhibitor is pseudoplastic and thixotropic. The composition forms a gel upon standing. The composition forms a soft, flexible coating which can replace paints, varnishes, lacquers, plastics and metal coatings frequently used to protect metal surfaces from corrosion.

Therefore, there is a strong need for a corrosion-inhibiting non-amine, less toxic additive which is a more environmentally acceptable alternative. In the present invention, a phosphoglyceride compound surprisingly provides protection of metallic surfaces from corrosion in aqueous and non-aqueous solutions.

SUMMARY OF THE INVENTION

The present invention provides an effective method of inhibiting corrosion e.g., carbon dioxide corrosion, on metallic surfaces in contact with a fluid contained in an industrial fluid system, which comprises adding to such fluid an effective corrosion controlling amount of a phosphoglyceride compound.

The phosphoglyceride compound may be, e.g., phosphatidyl choline (PC), commonly known as lecithin, phosphatidyl ethanolamine (PE), or phosphatidyl serine (PS). In a preferred embodiment of the invention, the phosphoglyceride compound is lecithin. The lecithin compound has the following structure:

$$CH_2(R)CH(R^1)CH_2OPO(OH)O(CH_2)_2N(OH)(CH_3)_3$$

where R, $R^1$ may be fatty acid groups, e.g., linolenic, stearic, oleic and/or palmitic acids.

The compositions of the present invention should be added to the fluid system for which corrosion inhibition activity of the metal parts in contact with the fluid system is desired, in an amount effective for the purpose. This amount will vary depending upon the particular system for which treatment is desired and will be influenced by factors such as the area subject to corrosion, pH, temperature, water quantity and respective concentrations in the water of corrosive species. For the most part, the present invention will be effective when used at levels of from about 0.025-50 parts per million (ppm) of fluid, and preferably from about 0.025-10 ppm of fluid contained in the system to be treated. The present invention may be added directly to the desired fluid system in a fixed quantity and in a state of an aqueous solution, continuously or intermittently. The fluid system may be, e.g., a cooling water, boiler water, boiler steam, gas scrubbing or pulp and papermaking system. Other examples of fluid systems which may benefit from the treatment of the present invention include heat transfer systems, refinery systems, food and beverage systems, pharmaceutical utility steam, and mechanical coolant systems.

DESCRIPTION OF THE PREFERRED EMBODIMENTS

The invention will now be further described with reference to a number of specific examples which are to be regarded solely as illustrative and not as restricting the scope of the present invention.

Testing was performed in a laboratory corrosion test apparatus. The apparatus included a source of deionized and deoxygenated water, a high-pressure pump, a series of metering pumps to deliver the materials, and associated sensors.

The testing apparatus for the present invention included a 16 foot mild steel coil (OD: 0.25", ID: 0.135")that was used as the corroding metal. Details of the experimental conditions are as follows: 1. as fluid deionized carbonated water was used; 2. inlet oxygen concentration of 10 ppb; 3. flow of 180 ml/min inside the mild steel coil; 4. temperature of the coil and the flowing solution was maintained at 104° C.±3° C.

For better thermal stability, the coil was housed in a heated can filled with sand. Two internal thermocouples monitored the coil's inlet/outlet temperatures. The $CO_2$ concentration was maintained constant and measured with a carbon analyzer, Sievers TOC 800. The pH of the solution was estimated at 5.15±0.10.

The total iron concentration in the fluid at the outlet of the apparatus was representative of the corrosion in the mild steel coil. The iron concentration was roughly estimated colorimetrically in the laboratory with 1,10 phenanthroline as reactive, and the total iron content was determined by inductive coupled plasma (ICP).

The percentage corrosion inhibition was calculated as the difference in total iron concentration at the outlet of the coil between the untreated coil (Fe ppm UT) at the conditions of the run and the total iron concentration exiting the chemically treated coil (Fe ppm T) at the same experimental conditions: % Corrosion Inhibition=((Fe ppm UT)−Fe ppm T))×100)/(Fe ppm UT).

The kinetic of the iron release was followed for the untreated coil and for some treated runs. The untreated iron coil equilibrated quickly, in 4 to 8 hours. The following results were for equilibration times of 20-26 hours for each concentration. During that time, in order to follow the kinetics of the iron release, outlet fluid samples were taken and analyzed for total iron content. Calculations of the percent inhibition given by the chemical were carried out using the iron total concentration measured at the end of the set equilibration time (20-26 hours).

Before and after each run, the iron coil was disconnected from the apparatus, activated, reconnected, and allowed to reach equilibrium in total iron concentration prior to the start of the treatment. The measured total iron concentration is referred to as (Fe ppm UT) in the above formula.

Lecithin from soybean, available from Fluka GmbH, was tested as a corrosion inhibitor in the test apparatus with the procedure described above. The chemical is known as 3-sn phosphatidylcholine from soybean, phosphatidyl choline, L-a-Lecithin; L-a-phosphatidylcholine. Note that the chemical is not water soluble, but emulsifies easily in water.

Table 1 presents the percent corrosion inhibition obtained when lecithin was fed to the iron coil in the test apparatus. The total iron concentrations as measured by ICP were used to calculate the percent inhibition. The results demonstrated that the chemical was acting as a metal corrosion inhibitor.

TABLE 1

% Corrosion Inhibition when Lecithin is fed

| Run | Lecithin (ppm) | % Corrosion Inhibition |
|---|---|---|
| 1 | 0 | 0.0 |
| 1 | 1 | 44.8 |
| 1 | 2 | 43.5 |
| 2 | 0 | 0.0 |
| 2 | 1 | 43.2 |
| 2 | 2 | 51.1 |

Refined and crude soybean oils were also tested as corrosion inhibitors in the corrosion test apparatus following the same procedure as described above. Note that the oils used are not water soluble. In order feed them into the test water, the materials were emulsified. A sucrose fatty acid ester (sucrose ester—a nonionic, water soluble surfactant) at about 10% by weight of the oil was used for this purpose. To form the emulsion, the oil was added in small amounts to a solution of the ester in water at 60-65° C., with vigorous stirring. Tables 2 and 3 show the results in percent corrosion inhibition of the metal obtained. The outcome demonstrated that the emulsions acted as a metal corrosion inhibitor.

TABLE 2

% Corrosion Inhibition obtained with Refined Soybean Oil

| Run | Refined Soybean Oil (ppm) | % Fe Inhibition |
|---|---|---|
| 1 | 0 | 0 |
| 1 | 0.34 | 8.0 |
| 1 | 0.86 | 21 |
| 1 | 1.1 | 28 |
| 2 | 0 | 0 |
| 2 | 1 | 7 |

TABLE 2-continued

% Corrosion Inhibition obtained with Refined Soybean Oil

| Run | Refined Soybean Oil (ppm) | % Fe Inhibition |
|---|---|---|
| 2 | 2.2 | 65 |
| 3 | 0 | 0 |
| 3 | 1.05 | 10 |
| 3 | 3.19 | 16 |
| 4 | 0 | 0 |
| 4 | 0.99 | 32 |
| 4 | 2.01 | 83 |

TABLE 3

% Corrosion Inhibition obtained with Emulsified Crude Soybean Oil

| Run | Crude Soybean Oil (ppm) | % Fe Inhibition |
|---|---|---|
| 1 | 0 | 0 |
| 1 | 0.96 | 64 |
| 1 | 2.54 | 63 |
| 2 | 0 | 0 |
| 2 | 0.99 | 21 |
| 2 | 2.5 | 45 |

While this invention has been described with respect to particular embodiments thereof, it is apparent that numerous other forms and modifications of this invention will be obvious to those skilled in the art. The appended claims in this invention generally should be construed to cover all such obvious forms and modifications which are within the true spirit and scope of the present invention.

What is claimed is:

1. A method of inhibiting corrosion on metallic surfaces in contact with a fluid contained in an aqueous fluid system, which comprises adding to such fluid in a steam header an effective corrosion controlling amount of an emulsified phosphoglyceride compound selected from the group consisting of phosphatidyl choline, phosphatidyl ethanolamine and phosphatidyl serine, wherein the fluid system is selected from the group consisting of boiler water systems, food and beverage systems, and pharmaceutical utility steam.

2. The method as recited in claim 1 wherein said phosphoglyceride compound is derived from soybean oil.

3. The method as recited in claim 1 wherein said compound is added to the fluid system at active treatment levels ranging from about 0.025 to about 50 parts per million.

4. The method as recited in claim 1 wherein said compound is added to the fluid system at active treatment levels ranging from about 0.025 to about 10 parts per million.

5. A method of inhibiting carbon dioxide corrosion on metallic surfaces in contact with a fluid contained in an aqueous fluid system, which comprises adding to such fluid in a steam header an effective corrosion controlling amount of an emulsified phosphatidyl choline compound, wherein the fluid system is selected from the group consisting of boiler water systems, food and beverage systems, and pharmaceutical utility steam.

6. The method as recited in claim 5 wherein said compound is added to the fluid system at active treatment levels ranging from about 0.025 to about 50 parts per million.

7. The method as recited in claim 6 wherein said compound is added to the fluid system at active treatment levels ranging from about 0.025 to about 10 parts per million.

8. A method of inhibiting corrosion on metallic surfaces in contact with a fluid contained in an aqueous fluid system, which comprises adding to such fluid in a steam header an effective corrosion controlling amount of an emulsified phosphoglyceride compound selected from the group consisting of phosphatidyl choline, phosphatidyl ethanolamine and phosphatidyl serine, wherein the fluid system is selected from the group consisting of boiler water systems, food and beverage systems, and pharmaceutical utility steam, and said compound is added to the fluid system at active treatment levels ranging from about 1-2 parts per million.

9. The method as recited in claim 8 wherein said phosphoglyceride compound is derived from soybean oil.

* * * * *